(12) United States Patent
Feyereisen et al.

(10) Patent No.: US 12,371,184 B2
(45) Date of Patent: Jul. 29, 2025

(54) SYSTEMS AND METHODS FOR PRESENTING A QUALITATIVE RISK ASSESSMENT FOR AN AIRCRAFT TO PERFORM A FLIGHT PROCEDURE

(71) Applicant: HONEYWELL INTERNATIONAL INC., Charlotte, NC (US)

(72) Inventors: Thea Feyereisen, Minneapolis, MN (US); Ratan Khatwa, Redmond, WA (US); Gang He, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 573 days.

(21) Appl. No.: 17/646,808

(22) Filed: Jan. 3, 2022

(65) Prior Publication Data
US 2023/0211892 A1 Jul. 6, 2023

(51) Int. Cl.
| | | |
|---|---|---|
| G08B 3/00 | (2006.01) | |
| B64D 43/00 | (2006.01) | |
| B64D 45/00 | (2006.01) | |
| G08B 5/00 | (2006.01) | |
| G08B 7/00 | (2006.01) | |

(52) U.S. Cl.
CPC ............ B64D 43/00 (2013.01); B64D 45/00 (2013.01); *B64D 2045/0085* (2013.01)

(58) Field of Classification Search
CPC . B64D 43/00; B64D 45/00; B64D 2045/0085
See application file for complete search history.

(56) References Cited

U.S. PATENT DOCUMENTS

| | | | | |
|---|---|---|---|---|
| 5,841,260 A | * | 11/1998 | Imai | G11B 19/20 |
| | | | | 318/434 |
| 6,940,426 B1 | * | 9/2005 | Vaida | G08G 5/26 |
| | | | | 340/963 |
| 7,647,234 B1 | * | 1/2010 | Ruderman | G16H 40/67 |
| | | | | 706/924 |
| 7,688,212 B2 | * | 3/2010 | Farley | G08B 7/06 |
| | | | | 340/8.1 |
| 8,193,948 B1 | * | 6/2012 | Shapiro | G08G 5/51 |
| | | | | 701/16 |

(Continued)

FOREIGN PATENT DOCUMENTS

EP 3293718 A2 3/2018

*Primary Examiner* — Quang Pham
(74) *Attorney, Agent, or Firm* — Ingrassia Fisher & Lorenz, LLP (57) ABSTRACT

Systems and methods for presenting a qualitative risk assessment for an aircraft to perform a flight procedure. Methods include determining: a pilot support value that is representative of a human-machine interface (HMI) onboard the aircraft; a crew factors value representative of a number of pilots and respective experience; an equipment state value of the aircraft, representing available and functioning avionic systems; a type of procedure for the flight procedure; a remaining trip length; an airport facilities state value; an Airport facilities state value; a physical environment value; and, an environmental state value. The method calculates the qualitative risk assessment, as a function of the determined values/factors and presents the qualitative risk assessment in a predefined area on an avionic display in the aircraft.

19 Claims, 3 Drawing Sheets

(56) References Cited

U.S. PATENT DOCUMENTS

| | | | | |
|---|---|---|---|---|
| 8,706,357 | B1* | 4/2014 | van den Heuvel | B64D 45/00 |
| | | | | 701/14 |
| 9,002,544 | B1* | 4/2015 | Seah | G01C 23/00 |
| | | | | 701/16 |
| 9,310,222 | B1 | 4/2016 | Suiter et al. | |
| 9,852,258 | B1* | 12/2017 | Foster | G06F 30/33 |
| 9,852,632 | B2* | 12/2017 | Sempuku | G06V 20/58 |
| 10,319,347 | B2* | 6/2019 | Zaizen | G06T 11/60 |
| 10,467,913 | B1* | 11/2019 | Suiter | G08G 5/58 |
| 11,119,630 | B1 | 9/2021 | Marchetti | G06N 5/04 |
| 2008/0133300 | A1* | 6/2008 | Jalinous | G06Q 10/0637 |
| | | | | 705/7.29 |
| 2010/0023358 | A1* | 1/2010 | Fox | G06Q 10/06 |
| | | | | 705/1.1 |
| 2012/0296499 | A1* | 11/2012 | Kirchhofer | G05D 1/102 |
| | | | | 701/3 |
| 2013/0117066 | A1* | 5/2013 | Park | G06Q 10/06 |
| | | | | 705/7.28 |
| 2014/0006070 | A1* | 1/2014 | Stamler | G06Q 10/02 |
| | | | | 705/5 |
| 2015/0325064 | A1* | 11/2015 | Downey | H04W 4/021 |
| | | | | 701/29.3 |
| 2015/0339453 | A1* | 11/2015 | Richards | G16H 40/67 |
| | | | | 345/633 |
| 2016/0019668 | A1* | 1/2016 | Kilinski | G06F 40/205 |
| | | | | 705/325 |
| 2016/0055752 | A1* | 2/2016 | McCann | G08G 5/21 |
| | | | | 701/533 |
| 2016/0075446 | A1* | 3/2016 | Girod | B64D 45/00 |
| | | | | 340/963 |
| 2016/0098930 | A1* | 4/2016 | Dillingham | G01S 19/13 |
| | | | | 715/772 |
| 2016/0130013 | A1 | 5/2016 | Rangan et al. | |
| 2017/0073004 | A1* | 3/2017 | Shepard | B62D 15/028 |
| 2017/0243496 | A1* | 8/2017 | McCann | G08G 5/76 |
| 2017/0316163 | A1* | 11/2017 | Wall Warner | G06Q 50/22 |
| 2017/0346824 | A1* | 11/2017 | Mahabir | H04L 63/1433 |
| 2018/0201274 | A1* | 7/2018 | Matsumura | B60K 28/06 |
| 2018/0201276 | A1* | 7/2018 | Matsumura | B60W 40/09 |
| 2018/0251230 | A1* | 9/2018 | Chavez | G02B 27/017 |
| 2019/0009923 | A1* | 1/2019 | Rangan | G08G 5/30 |
| 2019/0054937 | A1* | 2/2019 | Graetz | B64U 10/14 |
| 2019/0069128 | A1* | 2/2019 | Catalano | H04W 4/02 |
| 2019/0113615 | A1* | 4/2019 | Takaki | B60W 10/18 |
| 2019/0213890 | A1* | 7/2019 | Hosamani | B64D 45/08 |
| 2019/0257656 | A1* | 8/2019 | Campbell | G01C 21/005 |
| 2019/0272372 | A1* | 9/2019 | Ananthanpillai | G06F 3/04842 |
| 2019/0389565 | A1* | 12/2019 | Lissajoux | G08G 5/21 |
| 2020/0066069 | A1* | 2/2020 | Kapoor | G07C 5/085 |
| 2020/0180507 | A1* | 6/2020 | Katou | G08G 1/163 |
| 2020/0250596 | A1* | 8/2020 | Matthews | G08G 5/22 |
| 2020/0268301 | A1* | 8/2020 | Alsbou | G08G 1/166 |
| 2020/0290740 | A1* | 9/2020 | Rangan | G08G 5/30 |
| 2020/0349527 | A1* | 11/2020 | Malchikov | G06N 20/00 |
| 2021/0012666 | A1* | 1/2021 | Schmidt | G08G 5/26 |
| 2021/0073561 | A1* | 3/2021 | Ben Abdelaziz | G06V 40/23 |
| 2021/0188322 | A1* | 6/2021 | Yoshida | G01C 21/34 |
| 2021/0209922 | A1* | 7/2021 | Yang | B60W 40/09 |
| 2021/0225177 | A1* | 7/2021 | Kostiuk | G08G 5/22 |
| 2021/0237576 | A1* | 8/2021 | Jahns | B60K 35/60 |
| 2021/0312823 | A1 | 10/2021 | Browne et al. | |
| 2021/0329161 | A1* | 10/2021 | Fujikawa | H04N 9/8205 |
| 2021/0358310 | A1* | 11/2021 | Sachs | G07C 5/008 |
| 2021/0401340 | A1* | 12/2021 | Gallagher | A61B 5/7405 |
| 2022/0130348 | A1* | 4/2022 | Katsurada | G06F 3/04886 |
| 2023/0123419 | A1* | 4/2023 | He | G08G 5/0065 |
| | | | | 701/3 |
| 2023/0219698 | A1* | 7/2023 | Campbell | B64D 43/00 |
| | | | | 701/3 |

* cited by examiner

SYSTEMS AND METHODS FOR PRESENTING A QUALITATIVE RISK ASSESSMENT FOR AN AIRCRAFT TO PERFORM A FLIGHT PROCEDURE

TECHNICAL FIELD

The following disclosure generally relates to display systems for mobile platforms. More particularly, the following disclosure relates to systems and methods for presenting a qualitative risk assessment for an aircraft to perform a flight procedure.

BACKGROUND

Approach and landing are statistically the highest risk and technically challenging flight procedures, for every level of aviation, from small aircraft to large jet aircraft. Multiple factors, pilot-related and aircraft-related, can increase the risk and technical challenge at these phases of flight.

Available technical solutions may take a "big data" approach, sifting through historical operational data to characterize an approach and landing risk, such as, "10% approaches have long landings on this runway." However, this data is often proprietary to the operator and therefore unavailable across platforms and users or may not exist to a large enough extent to provide any statistical significance. For example, a pilot may have never been to an airport or shot a particular approach before so there is no historical data to pull from. Other available solutions rely on a pilot self-assessment to characterize an approach and landing risk.

Accordingly, improved flight display systems and methods presenting a qualitative risk assessment for an aircraft to perform a flight procedure are desired. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method for presenting a qualitative risk assessment for an aircraft to perform a flight procedure. The method includes: determining a procedure type for the flight procedure; assigning a crew factors value representative of one or more pilots performing the flight procedure; assigning an equipment state value of the aircraft, the equipment state value representing available and functioning avionic systems onboard the aircraft; assigning a pilot awareness state value for the one or more pilots; determining an environmental context value for the-flight procedure; calculating the qualitative risk assessment, dynamically, as a function of the procedure type, the crew factors value, the equipment state value, the pilot awareness state value, and the environmental context value; and presenting the qualitative risk assessment in a predefined area on an avionic display in the aircraft.

Also provided is a system for presenting a qualitative risk assessment for an aircraft to perform a flight procedure. The system includes: a display device configured to render an avionic display; and a controller circuit operationally coupled to the display device, and configured to: determine a procedure type for the flight procedure; assign a crew factors value representative of one or more pilots performing the flight procedure; assign an equipment state value of the aircraft, the equipment state value representing available and functioning avionic systems onboard the aircraft; assign a pilot awareness state value for the one or more pilots; determine an environmental context value for the-flight procedure; calculate the qualitative risk assessment, dynamically, as a function of the procedure type, the crew factors value, the equipment state value, the pilot awareness state value, and the environmental context value; and present the qualitative risk assessment in a predefined area on an avionic display in the aircraft.

Another method for presenting a qualitative risk assessment for an aircraft to perform a flight procedure is provided. The method includes: rendering an avionic display on a display system in the aircraft; determining a pilot support value that is representative of a human-machine interface (HMI) onboard the aircraft; determining a type of procedure for the flight procedure; determining a remaining trip length as a function of a current flight plan; assigning a crew factors value representative of a number of pilots; assigning an equipment state value of the aircraft, the equipment state value representing available and functioning avionic systems onboard the aircraft; assigning an airport facilities state value representing runway lighting, runway length, and approach lighting; assigning an air traffic control (ATC) facilities state value representing approach control and radar; assigning a physical environment value representative of terrain surrounding a current location of the aircraft; determining an environmental state value that integrates on-board weather sensor data and externally sourced weather information; calculating the qualitative risk assessment, as a function of the equipment state value, remaining trip length, environmental state value, pilot support value, airport facilities state value, type of procedure, physical environment value, and crew factors value; assigning a numerical value, on a normalized scale, to the qualitative risk assessment; and presenting the qualitative risk assessment and the numerical value in a predefined area on the avionic display.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and.

DETAILED DESCRIPTION

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

As mentioned, approach and landing are statistically the highest risk and technically challenging flight procedures, for every level of aviation, from small aircraft to large jet aircraft. Risk during these flight procedures is affected by multiple factors, pilot-related and aircraft-related.

Non-limiting examples of factors affecting the risk of an approach and landing flight procedures include the number of pilots and the experience of the pilots, the physical and mental state of the pilot, the presence and status of various avionics systems, the availability of airport services and equipment, the type of approach, and environmental factors. Available flight guidance and display solutions do not resolve all technical problems associated with these flight procedures.

A technical solution is disclosed herein in the form of systems and methods for presenting a qualitative risk assessment for an aircraft to perform a flight procedure. Proposed embodiments calculate a quantitative risk for the flight procedure and present it on an avionic display in an intuitive visual format. Various embodiments represent the qualitative risk assessment using an intuitive alert indicator, therefore, providing heightened awareness of the qualitative risk assessment, which may positively impact crew decision making during the approach. Embodiments provide an objectively improved human-machine interface that can significantly reduce pilot workload and potential pilot errors.

Figure 1:
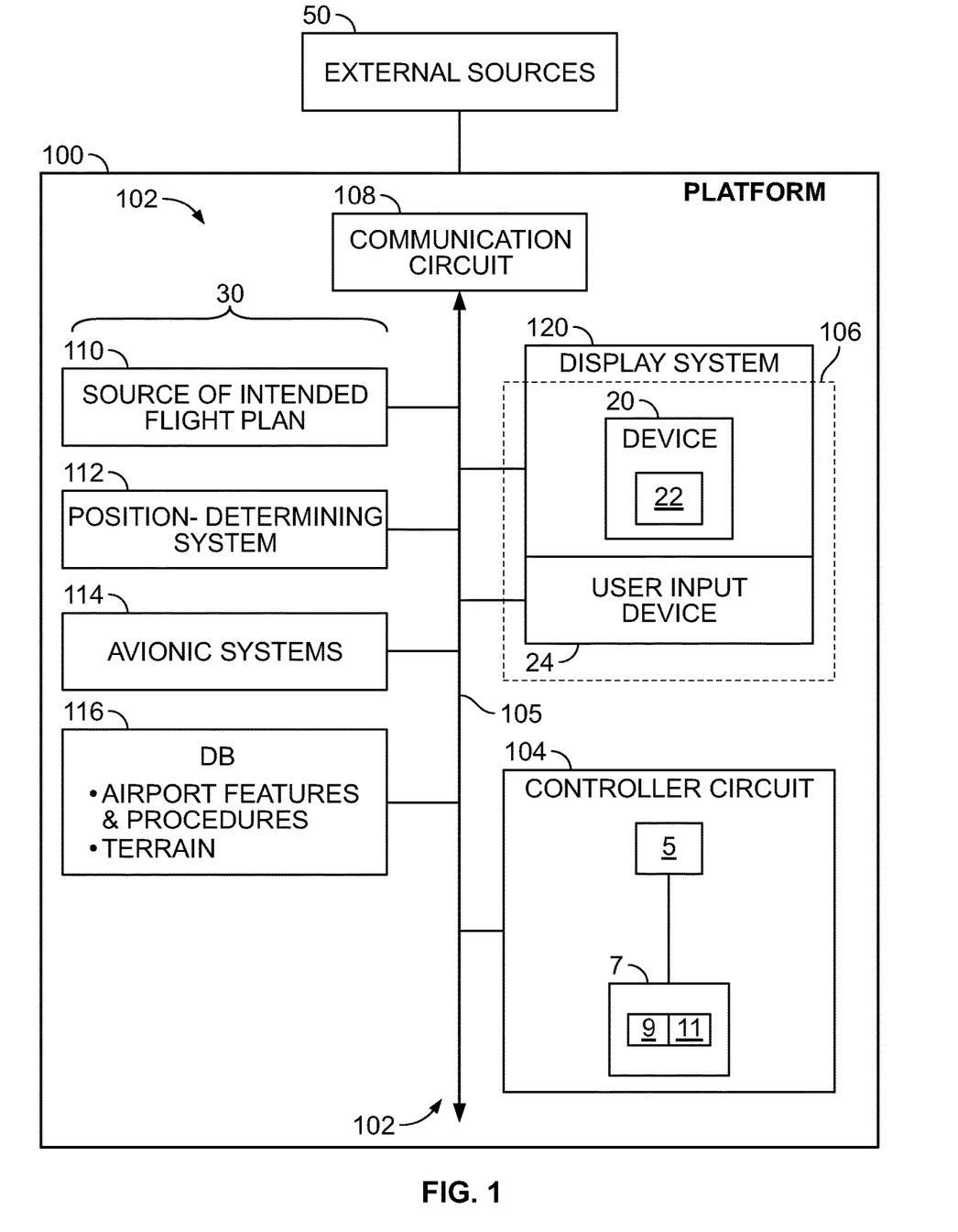
FIG. 1 shows a functional block diagram of an aircraft including a system for presenting a qualitative risk assessment for an aircraft to perform a flight procedure, in accordance with exemplary embodiments of the present disclosure.

FIG. 1 is a block diagram of a system for a system for presenting a qualitative risk assessment for an aircraft to perform a flight procedure (shortened herein to "system" 102), in accordance with an exemplary and non-limiting embodiment of the present disclosure. The system 102 may be utilized onboard a mobile platform to provide calibration of displayed synthetic images, as described herein. In various embodiments, the mobile platform is an aircraft 100, which carries or is equipped with the system 102. Aircraft 100 may be any type of vehicle that can travel through the air (i.e., without physical contact with terrain or water). As such, aircraft 100 may be any type of airplane (regardless of size or propulsion means, ranging from large, turbine-powered commercial airplanes to small, electrically-powered drones), rotorcraft (helicopter, gyrocopter), or glider, for example. Aircraft 100 may be "manned" in the conventional sense that the flight crew is present within the aircraft 100, or it may be manned remotely.

As schematically depicted in FIG. 1, system 102 includes a controller circuit 104 operationally coupled to: one or more on-board systems 30 and an HMI 106 (human-machine interface). The on-board systems 30 generally include a communications circuit 108; a source of an intended flight path 110, such as a navigation database (NavDB); a position-determining system 112, such as a navigation system; avionic systems 114; and a database 116. In various embodiments, the controller circuit 104 communicates with the other components of the system 102 via a communication bus 105. Each of the controller circuit 104, HMI 106, and on-board systems 30 may assume the form of a single device or multiple interconnected devices.

The human-machine interface, HMI 106, may generally include a display device 20 and a user input device (UI) 24. In various embodiments, the HMI 106 includes at least one instance of an integration of the user input device 24 and a display device 20 (e.g., a touch screen display). In various embodiments, the HMI 106 may include a user input device 24 such as, any combination of a keyboard, cursor control device, voice input device, gesture input apparatus, or the like. In various embodiments, the HMI 106 may include at least one user input device 24 configured with the hardware and software to detect one or more of: respiration rate, heart rate, eyes open/closed, pupil dilation, etc., and generate therefrom a biometric input. In various embodiments, the HMI 106 may include multiple display devices 20 and/or multiple user input devices 24.

The display system 120 is configured to receive and process information from various on-board aircraft systems, sensors, and databases (generally supplied via the communication bus 105), perform display processing and graphics processing, and to drive the one or more display device(s) 20 to render features in one or more avionic displays 22. The term "avionic display" is defined as synonymous with the term "aircraft-related display" and "cockpit display" and encompasses displays generated in textual, graphical, cartographical, and other formats. In various embodiments, the avionic display 22 is a primary flight display (PFD) or a navigation display. In various embodiments, the avionic display 22 can be, or include any of various types of lateral displays and vertical situation displays on which map views and symbology, text annunciations, and other graphics pertaining to flight planning are presented for a pilot to view.

As is described in more detail below, the avionic display 22, generated and controlled by the system 102, can include at least graphical user interface (GUI) objects and alphanumerical input/output displays of the type commonly presented on the screens of MCDUs, as well as Control Display Units (CDUs) generally. Specifically, embodiments of avionic display 22 includes one or more two-dimensional (2D) avionic displays, such as a horizontal (i.e., lateral) navigation display (INAV), electronic chart (e-chart) page or alerting system (CAS), or vertical navigation display; and/or on one or more three dimensional (3D) avionic displays, such as a Primary Flight Display (PFD) or an exocentric 3D avionic display. Embodiments provide enhancements to the existing avionic displays by presenting or overlaying, on a predefined area in the avionic display, additional GUI objects and alphanumerical information, as described herein. In various embodiments, these overlays or presentations are responsive to user requests via the HMI 106.

Accordingly, the display device 20 may be configured as a multi-function display (MFD) to include any number and type of image generating devices on which one or more avionic displays 22 may be produced. The display device 20 may embody a touch screen display. When the system 102 is utilized for a manned aircraft, display device 20 may be affixed to the static structure of the Aircraft cockpit as, for example, the aforementioned Head Up Display (HUD) unit, or a Head Down Display (HDD). Alternatively, display device 20 may assume the form of a movable display device (e.g., a pilot-worn display device) or a portable display device, such as an Electronic Flight Bag (EFB), a laptop, or a tablet computer carried into the Aircraft cockpit by a pilot.

In various embodiments, the HMI 106 further includes or has integrated therein an audio system capable of emitting speech and sounds, as well as of receiving speech input. In various embodiments, the HMI 106 may include any of: a graphical user interface (GUI), a speech recognition system, and a gesture recognition system. Via various display and graphics systems processes, the controller circuit 104 and display system 120 may command and control the generation, by the HMI 106, of a variety of graphical user interface (GUI) objects or elements described herein, including, for example, tabs, buttons, sliders, and the like, which are used to prompt a user to interact with the human-machine interface to provide user input, and to activate respective functions and provide user feedback, responsive to received user input at the GUI object.

An intended flight path may be a subset or part of an operational flight plan (OFP). An intended flight path may include a series of intended geospatial midpoints between a departure and an arrival, as well as performance data associated with each of the geospatial midpoints (non-limiting examples of the performance data include intended navigation data, such as: intended airspeed, intended altitude, intended acceleration, intended flight path angle, and the like). A source of the intended flight path 110 may be a storage location or a user input device. In various embodiments, a navigation database, NavDB, contains information required to construct the active trajectory or OFP. The NavDB is generally a storage location that may also maintain a database of flight plans data, and/or information regarding terrain and airports and/or other potential landing locations (or destinations) for the aircraft 100. In various embodiments, the system 102 is configured to continually generate and update one or more avionic displays, described herein. In various avionic displays, an active trajectory is determined and rendered. In some embodiments, information required to construct the active trajectory or OFP is sourced by a CNS system (Communication, Navigation, and Surveillance). In some embodiments, information required to construct the active trajectory or OFP is sourced from a "C2" (command and control center).

The position-determining system 112 may include a variety of sensors and performs the function of measuring and supplying aircraft state data and measurements to controller circuit 104 and other aircraft systems (via the communication bus 105) during aircraft operation. In various embodiments, the aircraft state data includes, without limitation, one or more of system measurements providing a location (e.g., latitude and longitude), Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. The position-determining system 112 may be realized as one or more of a global positioning system (GPS), inertial reference system (IRS), or a radio-based navigation system (e.g., VHF omni-directional radio range (VOR) or long-range aid to navigation (LORAN)), air data system, and it may include one or more navigational radios or other sensors suitably configured to support operation of the aircraft 100. In various embodiments, the controller circuit 104 can use GPS data and time of day data to make a determination that a flight procedure is being performed in either daytime or nighttime.

The avionic systems 114 is a collective functional block that provides, for each of a variety of aircraft 100 subsystems, current status and performance data. Examples of the status and performance data from respective avionic subsystems include engine thrust level, fuel level, flap configuration, braking status, temperature control system status, and the like. In an example, the aircraft sub-system may be landing gear, and its status may be an inefficiency, such as, that it is non-retracting. Avionic systems 114 may also include on-board environmental detection sensors for temperature/wind/humidity/precipitation, etc. As may be appreciated, the avionic systems 114 may therefore comprise a variety of components, including on-board detection sensors, which may be operationally coupled to the controller circuit 104, central management computer, or FMS.

A database 116 represents one or more onboard databases, each being a computer-readable storage media or memory. In various embodiments, onboard database 116 stores two- or three-dimensional map data, including airport features data (e.g., taxi routes and runways), geographical (terrain), buildings, bridges, and other structures, street maps, and may include the aforementioned NAVDB, having stored therein navigation communication frequencies. In various embodiments, the data stored in the database 116 may be regulated and periodically updated, as directed by a regulating entity.

It should be appreciated that aircraft 100 includes many more additional features (systems, databases, etc.) than the illustrated systems 106-120. For purposes of simplicity of illustration and discussion, however, the illustrated aircraft 100 omits these additional features.

External sources 50 may include air traffic control (ATC), ground stations, a weather subscription service, other subscription services, a traffic monitoring service, a neighbor traffic, and the like. In an embodiment, data from an external source 50 is an external a notice to airmen (NOTAM) message. In an embodiment, an external source 50 is an Automatic Terminal Information Service (ATIS).

In some embodiments, the controller circuit 104 functionality may be integrated within a preexisting mobile platform management system, avionics system, cockpit display system (CDS), flight controls system (FCS), or aircraft flight management system (FMS). Although the controller circuit 104 is shown as an independent functional block, onboard the aircraft 100, in other embodiments, it may exist in an electronic flight bag (EFB) or portable electronic device (PED), such as a tablet, cellular phone, or the like. In embodiments in which the control module is within an EFB or a PED, a display system 120 and user input device 24 may also be part of the EFB or PED.

The term "controller circuit," as appearing herein, broadly encompasses those components utilized to carry-out or otherwise support the processing functionalities of the system 102. Accordingly, in various embodiments, the controller circuit 104 can be implemented as a programmable logic array, application specific integrated circuit, system on a chip (SOC), or other similar firmware, as well as by a combination of any number of dedicated or shared processors, flight control computers, navigational equipment pieces, computer-readable storage devices (including or in addition to memory 7), power supplies, storage devices, interface cards, and other standardized components.

In various embodiments, as depicted in FIG. 1, the controller circuit 104 is realized as an enhanced computer system, having one or more processors 5 operationally coupled to computer-readable storage media or memory 7, having stored therein at least one novel firmware or software program 9 (generally, computer-readable instructions that embody an algorithm) for carrying-out the various process tasks, calculations, and control/display functions described herein. In various embodiments, predefined thresholds and parameters 11 are also stored in memory 7; parameters 11 include various thresholds used to create the normalized scales used by the controller circuit for calculating the qualitative risk assessment. The memory 7, may include volatile and nonvolatile storage in read-only memory (ROM), random-access memory (RAM), and keep-alive memory (KAM), for example. KAM is a persistent or non-volatile memory that may be used to store various operating variables while the processor 5 is powered down. The memory 7 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 5.

During operation, the processor 5, and hence the controller circuit 104, may be programmed with and execute the at least one firmware or software program (for example, program 9, described in more detail below) that embodies an algorithm for receiving, processing, enabling, generating, updating, and rendering, described herein, to thereby perform the various process steps, tasks, calculations, and control/display functions described herein.

Controller circuit 104 may exchange data, including real-time wireless data, with one or more external sources 50 to support operation of the system 102 in embodiments. In this case, the controller circuit 104 may utilize the communication bus 105 and communications circuit 108.

In various embodiments, the communications circuit 108 includes the hardware and software to support one or more communication protocols for real-time wireless communication between the processor 5 and external sources, such as air traffic control (ATC), communication towers, ground stations, satellites, and the cloud. In various embodiments, the communications circuit 108 supports wireless data exchange over a communications network, such as bidirectional pilot-to-ATC (air traffic control) communications via a datalink; a public or private network implemented in accordance with Transmission Control Protocol/Internet Protocol architectures or other conventional protocol standards. In various embodiments, the controller circuit 104 and communications circuit 108 support controller pilot data link communications (CPDLC), such as through an aircraft communication addressing and reporting system (ACARS) router; in various embodiments, this feature may be referred to as a communications management unit (CMU) or communications management function (CMF) uplink. Encryption and mutual authentication techniques may be applied, as appropriate, to ensure data security. In various embodiments, the communications circuit 108 supports communication with technicians, and/or one or more storage interfaces for direct connection to storage apparatuses. In various embodiments, the communications circuit 108 is integrated within the controller circuit 104.

Figure 2:
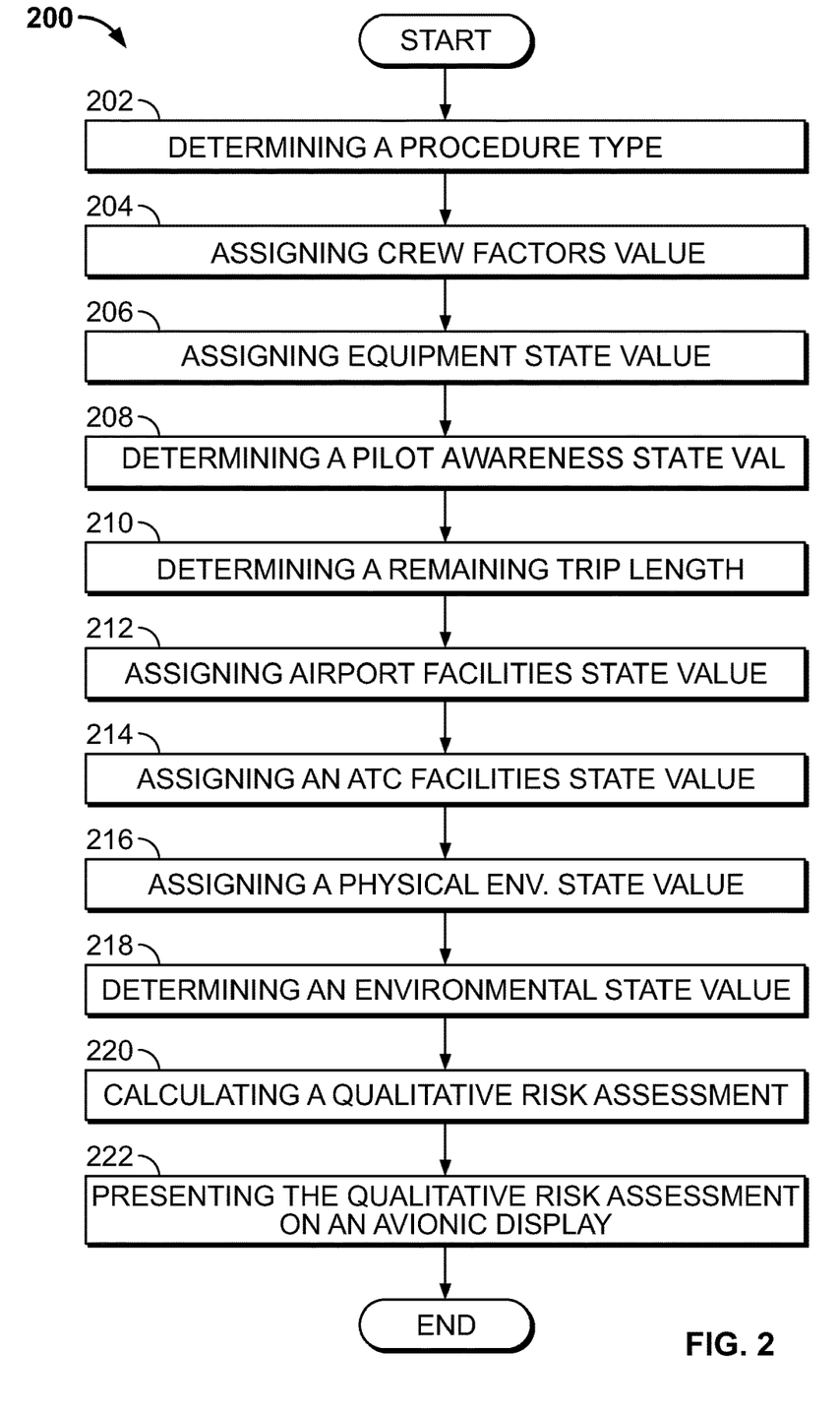
FIG. 2 is a flowchart illustrating a method for presenting a qualitative risk assessment for an aircraft to perform a flight procedure, in accordance with exemplary embodiments of the present disclosure.

Turning now to FIG. 2, and with continued reference to FIG. 1, a flowchart of a method 200 for presenting a qualitative risk assessment for an aircraft to perform a flight procedure is provided, in accordance with exemplary embodiments of the present disclosure. For illustrative purposes, the following description of method 200 may refer to elements mentioned above in connection with FIGS. 1 & 3, for example, the tasks/operations may be performed by the controller circuit 104. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Specifically, the tasks performed in steps 202-218 may performed concurrently, or in any order, prior to the step 220, below. Moreover, one or more of the tasks shown in FIG. 2 could be omitted from an embodiment of the method 200 as long as the intended overall functionality remains intact.

At 202, the method 200 determines a type of procedure for the flight procedure. Non-limiting examples of the flight procedure include an instrument approach procedure (IAP), having a category assignment, a precision or a non-precision approach, a circling approach, or the like. Also, at 202, the method 200 may perform an optional task of determining a pilot support value that is representative of a human-machine interface (HMI) onboard the aircraft is performed at 202. In a non-limiting example, the system 102 may assess or count a number of interface devices: a display device, a touch-sensitive display device, a speech input/output, a keyboard, and a cursor-control instrument, and assign a number on a normalized scale of 1-3 based on the count. For example, three interface devices may be a 2, 4 or more interface devices may be a 3, and less than three may be a 1.

At 204, the method 200 moves to assigning a crew factors value. In some embodiments, the crew factors value is representative of a number of pilots performing the flight procedure. In some embodiments, the crew factors value is representative of a combination of the number of pilots and a respective experience of each pilot. In a non-limiting example, a scale of 1-5 is used. In a non-limiting example, each pilot is a point. In a non-limiting example, a pilot is assigned a point for each 5 years of experience. For example, pilot 1=4 years of experience counts as 2 points, and with only this pilot, this crew factors value is 2. For another example, in addition to pilot 1, pilot 2 has 8 years of experience counts as 3 points; in combination, this crew factors value is 5.

At 206, the method 200 moves to assigning an equipment state value of the aircraft, the equipment state value representing available and functioning avionic systems onboard the aircraft. As mentioned above, the avionic systems comprise avionic sub-systems, and a respective avionic sub-system may generate each of the following types of avionic data: engine thrust level, fuel level, flap configuration, braking status, and temperature control system status. In an embodiment, each status may be one of [acceptable/needs attention] or one of [low concern/medium caution/high concern], and a number can be assigned to the status. In keeping with the above non-limiting examples, higher numbers are more desirable, so acceptable or low concern would be a 5 on a 1-5 scale. In other embodiments, lower numbers are assigned to the most desirable values. In various embodiments, the method 300 integrates all the avionic sub-system statuses into one representative equipment state value of the aircraft 100.

At 208, the method 200 assigns a pilot awareness state value. In some embodiments, the pilot awareness state value is based on an aircraft specific parameter, such as, a number of pilots required to operate the aircraft, and calculating the qualitative risk assessment at 220 is further a function of the biometric input. In other embodiments, the method 200 assigns a pilot awareness state value based on biometric input from a biometric measurement device and calculating the qualitative risk assessment at 220 is further a function of the biometric input. In various embodiments, one or more of the user input devices 24 is a biometric measurement device, and the system 102 continually monitors biometric input from the pilot. In various embodiments, the biometric device is mounted within a cockpit, and the biometric input measured is eyes open or closed, distribution of weight in the seat (e.g. to distinguish slouching as when sleeping), or signals from the heart. In an embodiment, biometric input is eyes open or closed, extracted from a camera scanning the pilot's face. In an embodiment, biometric input is heart rate or EKG signal, measured by an appropriate equipment, and may be used to represent a state of stress. In various embodiments, one or more of the biometric measurement devices employed is a wearable personal health monitor, and the biometric input from it represents sleep deprivation, oxygen in the blood stream, and/or an activity status. As with the other factors, the pilot awareness value can be normalized to a scale of 1-3 or 1-5, with the higher numbers being more favorable.

At optional step 210, the method 200 determines a remaining trip length as a function of a current flight plan. As may be appreciated, this may include a step of matching a current location and heading with a flight path in the flight plan. When this optional step is performed, it may affect the risk calculation in combination with other factors, such as the crew factors value and pilot awareness value. In an example, the highest degree of difficulty would be assigned a 1, and potentially displayed as a red color alert.

An environmental context value is assigned for the procedure, as shown by optional tasks 212, 214, 216, and 218. The environmental context value is normalized to the same arbitrarily selected scale described above. For example, a numerical scale from 1-3 or 1-5, in which the higher the value, the more favorable for completing the procedure. The environmental context value can represent any combination of the following factors, described in more detail below: an airport facilities state value; an air traffic control (ATC) state value; a physical environment value; and an environmental state value.

At optional 212, the method 200 assigns an airport facilities state value representing runway lighting, runway length, and approach lighting. As with other tasks of the method 200, this step may count the presence of each type of airport facility and convert the count to a normalized scale of 1-3 or 1-5.

At optional 214, the method 200 assigns an air traffic control (ATC) state value for the airport. In various embodiments, the ATC state value represents available technology such as approach control and radar. As with other tasks of the method 200, this step may count the presence of approach control and radar devices and convert the count to a normalized scale of 1-3 or 1-5, with the higher number being the most desirable.

At optional 216, the method 200 moves to assigning a physical environment value representative of terrain surrounding a current location of the aircraft. As with other tasks of the method 200, this step may count the presence of objects or terrain variations that exceed a threshold in elevation per distance and convert the count to a normalized scale of 1-3 or 1-5. For example, terrain that is smooth would be a 3 or a 5, whereas terrain that is jagged or full of objects would be a 1.

At optional 218, the method 200 moves to determining an environmental state value that integrates on-board weather sensor data and externally sourced weather information. This step includes receiving on-board weather data and receiving external weather data, integrating the received weather data, and converting the integrated weather data to a normalized scale of 1-3 or 1-5. Again, in keeping with the above examples, the higher numbers would be the more desirable numbers. For example, heavy winds and driving rain may be assigned a 1, and calm weather may be assigned a 5.

Accordingly, in some embodiments, the environmental context value is solely based on one of: an airport facilities state value; an air traffic control (ATC) state value; a physical environment value; or an environmental state value. In some embodiments, the environmental context value is a function of any two of: an airport facilities state value; an air traffic control (ATC) state value; a physical environment value; or an environmental state value. In some embodiments, the environmental context value is a function of any three of: an airport facilities state value; an air traffic control (ATC) state value; a physical environment value; or an environmental state value. And, in some embodiments, the environmental context value is a function of all of: an airport facilities state value; an air traffic control (ATC) state value; a physical environment value; or an environmental state value. Regardless of the components making up the environmental context value, the environmental context value is normalized to the scale described above (e.g., 1-3 or 1-5). For example, even terrain and calm weather could be a 3 or a 5, and in another example, poor approach control and radar combined with poor runway lighting and heavy rain could be a 1. Other examples may include a temporary failure of precision approach guidance for the airport, leading to lower scores for airport facilities when conducting night or reduced visibility weather condition operations.

As mentioned above, the assessments/determinations made in steps 202-218 may be concurrent or be ordered differently. Once all the individual qualitative assignments from steps 202-218 are made, the method 200 proceeds to calculating the qualitative risk assessment at 220, as a function of the equipment state value, remaining trip length, environmental state value, pilot support value, airport facilities state value, type of procedure, physical environment value, and crew factors value. In performing step 220, the system 102 dynamically adjusts its risk computation as a function of the normalized values of each input value, assigning different weights to the values/factors. For example, if the pilot awareness value is low (unfavorable), this is assigned a high weight and can overtake other favorable risk factors such as a favorable environmental context value, resulting in a dynamically adjusted qualitative risk assessment that is an alert (e.g. red) instead of a warning (e.g., yellow). Likewise, various components of the environmental context value, such as a severe localized storm, can drive the qualitative risk assessment for the procedure toward an alert, even with two experienced pilots that are fully rested and alert. In another example, two experienced pilots that are each well rested and alert can be weighted high as compared to poor airport lighting around the landing area. In embodiments in which the alphanumeric explanation and numerical value are displayed, examples above might present: alert-1, pilot fatigue; alert-1, lightening storm; or proceed-5, favorable pilot awareness.

In various embodiments, the qualitative risk assessment is represented on an alert indicator, as one of a low, medium, or high alert.

At 222, the method 200 moves to presenting the qualitative risk assessment in a predefined area on an avionic display 22 (e.g., FIG. 3, 300) in the aircraft. As may be appreciated, at 222, the system 102 is generally already rendering an avionic display of a type described above. In various embodiments, step 220 may include a conversion of a final calculated number to a number for the alert indicator, and at step 222 the method 200 may further display an assigned numerical value to the alert indicator representing the qualitative risk assessment. In various embodiments, step 220 may include determining a reason for the alert indicator, the reason being a factor from among all the factors determined and assigned in (202-218) that exerts the largest influence on the resulting qualitative risk assessment, and at 222, the method 200 may further display an alphanumeric descriptor indicating the reason for the numerical value to the qualitative risk assessment.

In various embodiments, the system 102 is further determining that the flight procedure is being performed in either daytime or nighttime, based on a time of day and a GPS location of the aircraft, and calculating the qualitative risk assessment at 220 is further a function of the daytime or nighttime.

Figure 3:
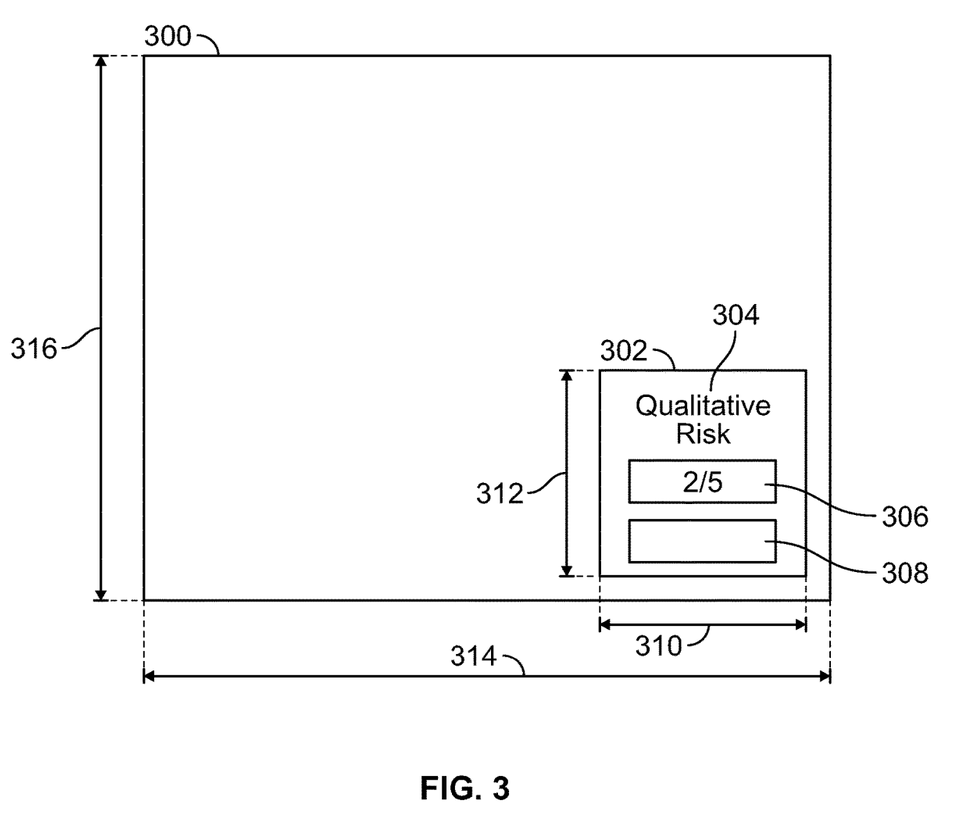
FIG. 3 is an illustration of an avionic display having a dedicated area for the display of a qualitative risk assessment for an aircraft to perform a flight procedure, determined by embodiments described herein.

FIG. 3 provides a simplified illustration of an avionic display 300, as may be used by system 102. The avionic display 300 can be an FMS page, an INAV display, or the like. The avionic display has width 314 and height 316. The qualitative risk assessment 302 is overlaid on a portion of the area of the avionic display 300. As shown in FIG. 3, the qualitative risk assessment 302 is overlaid in the bottom right, has height 312 and width 310, and takes up approximately 25% of the width and approximately 30% of the height. A label 304 may designate the overlay as a qualitative risk overlay. The alert indicator 306 is depicted in the example as a bar shape but may take a variety of shapes.

In various embodiments, visually distinguishing techniques such as color coding, shading, or hatching are used to make the alert indicator 306 quickly and objectively recognizable to the viewer. For example, in various embodiments, the alert indicator 306 uses color coding to distinguish a low alert, a medium alert, and a high alert from each other, e.g., low alert is green, medium alert is yellow/amber, and high alert is red.

In FIG. 3, a number 2/5 is an assigned numerical value to the alert indicator representing the qualitative risk assessment, and area 308 may be used to present an alphanumeric descriptor indicating a reason for the numerical value to the qualitative risk assessment.

Accordingly, the present disclosure has provided several embodiments of systems and methods for presenting a qualitative risk assessment for an aircraft to perform a flight procedure. Proposed embodiments advantageously do not depend on pilot self-assessments and are not reliant upon historical data.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 9 or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for presenting a qualitative risk assessment for an aircraft to perform a flight procedure, comprising:
   determining a procedure type for the flight procedure;
   determining a pilot support value representative of a human-machine interface (HMI) onboard the aircraft and that is a representative of a count of a number of pilot interface devices in a cockpit;
   assigning a crew factors value representative of a number of one or more pilots on the aircraft performing the flight procedure;
   assigning an equipment state value of the aircraft, wherein the equipment state value representing available and functioning avionic systems onboard the aircraft;
   assigning a pilot awareness state value for the one or more pilots;
   determining an environmental context value for the-flight procedure;
   calculating the qualitative risk assessment, dynamically, as a function of the procedure type, the pilot support value, the crew factors value, the equipment state value, the pilot awareness state value, and the environmental context value;
   assigning a numerical value, based on a normalized scale, to an alert indicator representing the qualitative risk assessment; and
   presenting the qualitative risk assessment in a predefined area on an avionic display comprising attempting to perform said calculating to display the qualitative risk assessment which impacts a decision by a crew on the aircraft related to the procedure type, wherein the presenting comprising displaying the qualitative risk assessment in an overlay with the predefined area on the avionics display that is displayable without the overlay and used to operate the aircraft, wherein the predefined area comprises a qualitative risk overlay label of the predefined area, the numerical value to the alert indicator, and an alphanumeric descriptor word or phrase indicating a reason for the numerical value, and wherein the predefined area has the alert indicator that uses color coding to distinguish the alert indicator depending on a level of the alert indicator.

2. The method of claim 1, further comprising:
receiving a biometric input for a pilot of the one or more pilots;
assigning the pilot awareness state value based on the biometric input; and
said calculating the qualitative risk assessment based on the biometric input.

3. The method of claim 1, further comprising:
determining that the flight procedure is being performed in either daytime or nighttime, based on a time of day and a GPS location of the aircraft; and
said calculating the qualitative risk assessment is based on the daytime or nighttime determination.

4. The method of claim 1, wherein the qualitative risk assessment is accompanied by a low, medium, or high alert.

5. The method of claim 1, wherein the environmental context value is at least partly based on externally sourced weather information received from a notice to airmen (NOTAM) message or automatic terminal information service (ATIS) message.

6. The method of claim 1, wherein the predefined area is displayed on the avionic display on the aircraft on an instrument navigation (INAV) page, a primary flight display (PFD), a horizontal navigation display, a vertical navigation display, a 3D avionic display, an exocentric 3D avionic display, an electronic chart (e-chart) page, a flight management system (FMS) page, or a crew alerting system (CAS) display.

7. The method of claim 1, wherein each of the pilot support value, the crew factors value, the equipment statue value, the pilot awareness state value, and the environmental context value being used to determine the qualitative risk assessment has a corresponding predetermined reason available to be used as the alphanumeric descriptor to be displayed.

8. The method of claim 1, wherein one or more of the pilot support value, the crew factors value, the equipment statue value, the pilot awareness state value, and the environmental context value used to calculate the qualitative risk assessment are weighted to be used in the function to calculate the qualitative risk assessment.

9. The method of claim 8, wherein the pilot support value, the crew factors value, the equipment statue value, the pilot awareness state value, and the environmental context value used to calculate the qualitative risk assessment are determined for a time point during a flight of the aircraft, and the qualitative risk assessment is calculated and displayed for the time point during the flight of the aircraft.

10. A system for presenting a qualitative risk assessment for an aircraft to perform a flight procedure, comprising:
a display device configured to render an avionic display; and
a controller circuit operationally coupled to the display device, and configured to:
determine a procedure type for the flight procedure;
determining a pilot support value representative of a human-machine interface (HMI) onboard the aircraft and that is a representative of a count of a number of pilot interface devices in a cockpit;
assign a crew factors value representative a number of one or more pilots on the aircraft performing the flight procedure;
assign an equipment state value of the aircraft, wherein the equipment state value representing available and functioning avionic systems onboard the aircraft;
assign a pilot awareness state value for the one or more pilots;
determine an environmental context value for the-flight procedure;
calculate the qualitative risk assessment, dynamically, as a function of the procedure type, the pilot support value, the crew factors value, the equipment state value, the pilot awareness state value, and the environmental context value;
assign a numerical value, based on a normalized scale, to an alert indicator representing the qualitative risk assessment; and
present the qualitative risk assessment in a predefined area on the avionic display comprising attempting to perform said calculate to display the qualitative risk assessment which impacts a decision by a crew on the aircraft related to the procedure type; wherein said present comprising display the qualitative risk assessment in an overlay with the predefined area on the avionics display that is displayable without the overlay, and used to operate the aircraft, wherein the predefined area comprises a qualitative risk overlay label of the predefined area, the numerical value to the alert indicator, and an alphanumeric descriptor word or phrase indicating a reason for the numerical value, and wherein the predefined area has the alert indictor that uses color coding to distinguish the alert indicator depending on a level of the alert indicator.

11. The system of claim 10, wherein the controller circuit is further configured to assign the pilot awareness state value based on a biometric input, and wherein said calculate the qualitative risk assessment is based on the biometric input.

12. The system of claim 10, wherein the controller circuit is further configured to:
determine that the flight procedure is being performed in either daytime or nighttime, based on a time of day and a GPS location of the aircraft; and
said calculate the qualitative risk assessment based on the daytime or nighttime.

13. The system of claim 10, wherein the qualitative risk assessment includes either a low, medium, or high alert.

14. The system of claim 10, wherein the environmental context value is at least partly based on externally sourced weather information received from a notice to airmen (NOTAM) message or automatic terminal information service (ATIS) message.

15. The system of claim 10, wherein the display device is an instrument navigation (INAV) page, a flight management system (FMS) page, a primary flight display (PFD), an electronic chart (e-chart) page, or a crew alerting system (CAS) display.

16. A method for presenting a qualitative risk assessment for an aircraft to perform a flight procedure, comprising:
rendering an avionic display on a display system in the aircraft;
determining a pilot support value that is representative of a human-machine interface (HMI) onboard the aircraft and that is a representative of a count of a number of pilot interface devices in a cockpit;

determining a type of procedure for the flight procedure;
determining a remaining trip length as a function of a current flight plan;
assigning a crew factors value representative of a number of pilots on the aircraft performing the flight procedure;
assigning an equipment state value of the aircraft, wherein the equipment state value represents available and functioning avionic systems onboard the aircraft;
assigning an airport facilities state value representing runway lighting, runway length, and approach lighting;
assigning an air traffic control (ATC) facilities state value representing approach control and radar;
assigning a physical environment value representative of terrain surrounding a current location of the aircraft;
determining an environmental state value that integrates on-board weather sensor data and externally sourced weather information;
calculating the qualitative risk assessment, as a function of the equipment state value, the remaining trip length, the environmental state value, the pilot support value, the airport facilities state value, the type of procedure, the physical environment value, and the crew factors value;
assigning a numerical value, on a normalized scale, to an alert indicator representing the qualitative risk assessment; and
presenting the qualitative risk assessment in a predefined area on the avionic display comprising attempting to perform the calculating to display the qualitative risk assessment which impacts a decision by a crew on the aircraft related to the procedure type, wherein said presenting comprising displaying the qualitative risk assessment in an overlay with a predefined area on the avionics display that is displayable without the overlay, and used to operate the aircraft, wherein the predefined area comprises a qualitative risk overlay label of the predefined area, the numerical value to the alert indicator, and an alphanumeric descriptor word or phrase indicating a reason for the numerical value, and wherein the predefined area has the alert indictor that uses color coding to distinguish the alert indicator depending on a level of the alert indicator.

17. The method of claim 16, further comprising displaying the alphanumeric descriptor indicating the reason for the numerical value to the qualitative risk assessment that recites "pilot fatigue" or "favorable pilot awareness".

18. The method of claim 16, further comprising:
determining that the HMI has a user input device configured to detect respiration rate, heart rate, eyes open/closed, or pupil dilation;
generating biometric input from the HMI;
assigning a pilot awareness state value based on the biometric input; and
said calculating the qualitative risk assessment further comprising the pilot awareness state value.

19. The method of claim 16, wherein said presenting the qualitative risk assessment includes rendering the alert indicator within a window that displays the numerical value within the predefined area and that uses the color coding to distinguish a low alert, a medium alert, and a high alert from each other.

* * * * *